Figure 1:
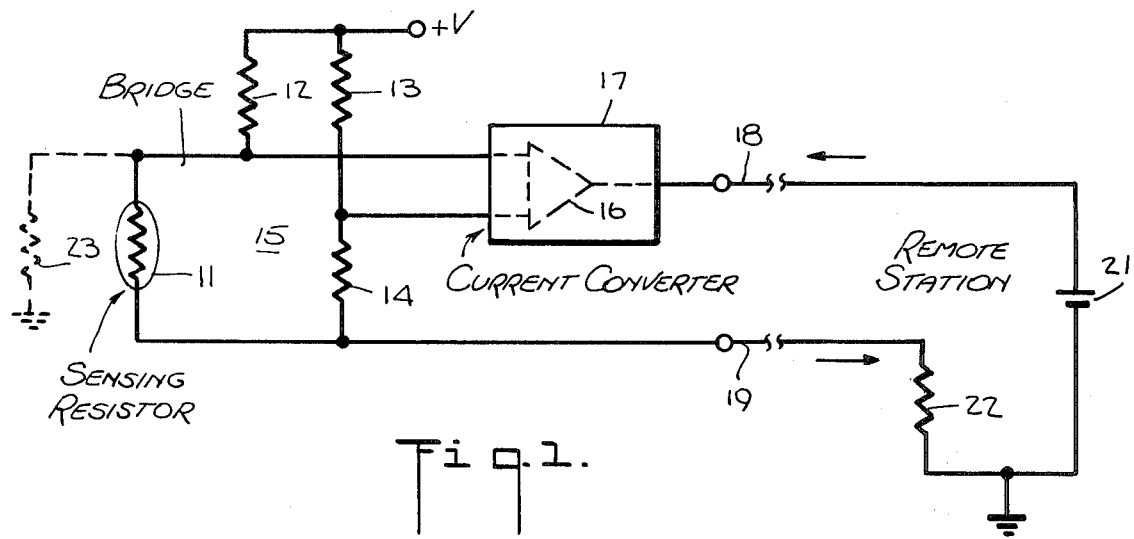

United States Patent [19]

Kobayashi

[11] 4,143,550

[45] Mar. 13, 1979

[54] RESISTANCE-TO-CURRENT CONVERTER

[75] Inventor: Tamotsu Kobayashi, Yokohama, Japan

[73] Assignee: Hokushin Electric Works, Ltd., Tokyo, Japan

[21] Appl. No.: 888,468

[22] Filed: Mar. 20, 1978

[30] Foreign Application Priority Data

Mar. 22, 1977 [JP] Japan ............................... 52/31437

[51] Int. Cl.$^2$ .......................................... G01K 7/24
[52] U.S. Cl. ....................... 73/362 AR; 324/DIG. 1; 323/75 H
[58] Field of Search .............. 73/362 AR, 204, 1 F; 324/65 R, DIG. 1; 323/75 H, 75 N

[56] References Cited

U.S. PATENT DOCUMENTS

| | | |
|---|---|---|
| 3,076,338 | 2/1963 | Peltola ........................... 73/362 AR |
| 3,603,147 | 9/1971 | Dorman ................................ 73/204 |
| 3,887,864 | 6/1975 | Knudsen ........................... 323/75 H |
| 4,072,051 | 2/1978 | Peterson ......................... 73/362 AR |

Primary Examiner—Stephen A. Kreitman
Attorney, Agent, or Firm—Michael Ebert

[57] ABSTRACT

A resistance-to-current converter in which a sensing resistor, such as a resistance thermometer bulb for sensing changes in temperature, forms an arm in a resistance bridge which is periodically excited by a switching circuit interposed between a power supply and the input junctions of the bridge. The voltage produced at the output junctions of the bridge during the "on" and "off" excitation states are separately detected. The detected signal obtained in the "off" state is subtracted from that obtained in the "on" state to produce an output signal from which there is eliminated the error component resulting from a leakage resistance path coupled to said sensing resistor.

5 Claims, 2 Drawing Figures

RESISTANCE-TO-CURRENT CONVERTER

BACKGROUND OF INVENTION

This invention relates generally to resistance-to-current converters, and more particularly to a converter which is responsive to the value of a sensing resistor such as a thermometer bulb that is subject to leakage resistance, the converter including means to cancel out the influence of such leakage on the output current signal.

When a two-wire transmission system is used for conveying a signal representing a change in a variable sensed by means of a resistance, such as a thermometer bulb responsive to changes in temperature, the existence of a leakage resistance gives rise to an error signal.

The conventional arrangement for this purpose is constituted by a bridge circuit, one of whose arms is formed by the sensing resistor, the output junctions of the bridge being connected to a converter that converts the voltage at these junctions to a corresponding current signal. This current signal is transmitted through a two-wire line to a load resistor at a remote station, one end of the resistor being grounded.

When a leakage resistance path is established between the sensing resistor and ground because of the degradation of the insulation of the sensing resistor or by reason of any other factor, an error signal is developed. As a consequence, the current signal produced across the load resistor does not accurately represent the variable being sensed, for it includes an error signal component.

SUMMARY OF INVENTION

In view of the foregoing, the main object of this invention is to provide a resistance-to-current converter which obviates errors in the current signals arising from resistance leakage produced by the degradation in the insulation of the sensing resistor or from any other factor.

More particularly, it is an object of the invention to provide a simple and efficient resistance-to-current converter of the above type in which the sensing resistor is included in a bridge circuit that is periodically excited, so that the output of the bridge is alternately in the "on" and "off" state.

Briefly stated, in a resistance-to-current converter in accordance with the invention, the sensing resistor which is subject to leakage is included as an arm in a bridge circuit which is excited periodically, the output of the bridge in the "on" state being detected by a sample hold circuit. The resultant first output includes an error signal component reflecting the leakage as well as a true signal component.

The output of the bridge in the "off" state is separately detected, this second output representing only the error component. The second output is subtracted from the first output to yield an output signal which represents the current signal free of error.

OUTLINE OF DRAWINGS

Figure 2:
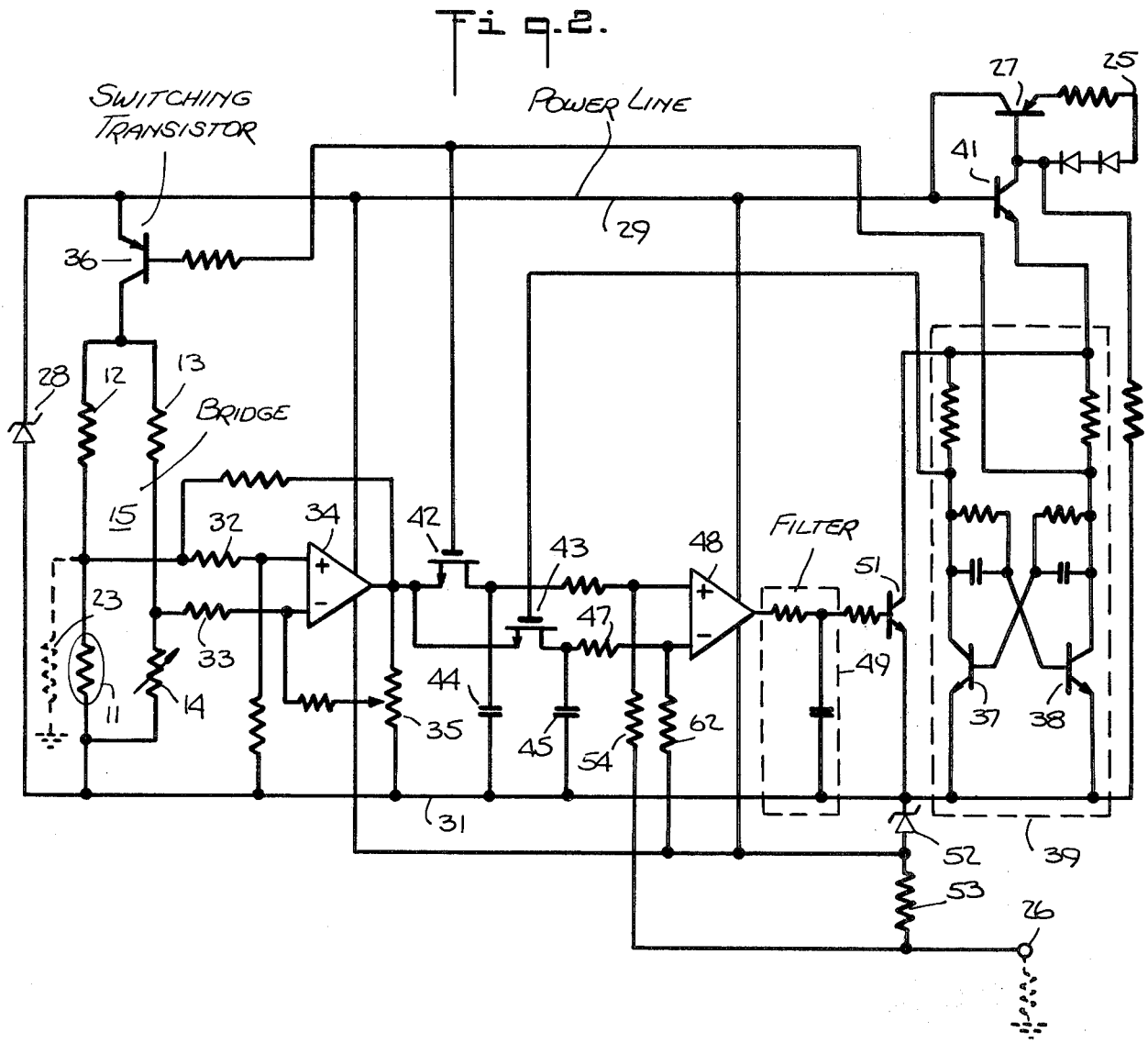

For a better understanding of the invention as well as other objects and further features thereof, reference is made to the following detailed description to be read in conjunction with the accompanying drawings, wherein:

FIG. 1 is a schematic circuit diagram of a conventional resistance-to-current converter; and FIG. 2 is a schematic circuit diagram of a signal-to-current converter in accordance with the invention.

DESCRIPTION OF INVENTION

The Conventional Converter

Referring now to FIG. 1, there is shown a conventional two-wire system for converting a sensed value derived by a sensing resistor into a corresponding current signal and for conveying this signal to a remote station to indicate or record this value or for controlling a process affected by the variable being sensed.

The system includes a sensing resistor 11 which forms one arm of a bridge 15 whose other arms are constituted by three resistors 12, 13 and 14. The output junctions of the bridge are formed by the junction between resistors 11 and 12 and the junction between 13 and 14. These output junctions are connected to the respective inputs of a current-converter 17 which includes an amplifier 16. A direct voltage is applied between the input junctions formed by the junction between resistors 12 and 13 and the junction between resistors 11 and 14.

The voltage at the output junctions of the bridge is converted by current-converter 17 into a corresponding current signal, typically in a range of 4 to 20 mA or whatever other operating range is appropriate. This current signal is conveyed over a transmission line formed by wires 18 and 19 to a remote station.

Wire 19 connects the input junction between sensing resistor 11 and resistor 14 in the bridge through a load resistor 22 at the receiving station to ground, while wire 18 connects the output of current converter 17 to the positive pole of a d-c source 21 whose negative pole is grounded.

As a result of insulation degradation or any other factor, a leakage resistance path (represented by resistor 23 in dashed lines) is developed between sensing resistor 11 and ground. When the voltage level on wire 19 increases because of current passing through load resistor 22, a leakage current will flow from wire 19 to ground through sensing resistor 11 and leakage resistor 23. This leakage current gives rise to an error signal, for it flows in a direction which is the reverse of the excitation current for the bridge.

We shall now assume, by way of example, the following set of conditions: (a) the voltage of voltage source 21 is 24 volts; (b) the current flowing through wires 18 and 19 of the transmission line lies in the 4 to 20 mA range; and (c) the resistance value of load resistor 22 is 250 ohms. The voltage then developed across load resistor 22 is in the 1 to 5 volt range, so that the maximum voltage established thereacross is 5 volts.

Further assuming that a platinum resistance wire having an ohmic value of 100 ohms is used as a sensing resistor 11, that the full span of this sensor is 10 ohms, that the excitation current is 1 mA, and the resistance value of leakage resistance 23 is 1M ohm, then the leakage current at the maximum voltage of 5 volts becomes $5\mu A$ (5 V/1M $\Omega$).

In the worst case, when degradation of the insulation of sensing resistor 11 takes place, the leakage current flows through all of sensing resistor 11; and in this instance, an error voltage of 0.5 mV (100 $\Omega$ × $5\mu A$) is generated. If, on the other hand, one could disregard the load efficiency of the bridge circuit, a signal voltage of 10 mV (10 $\Omega$ × 1mA) can then be obtained. In this case, a 5% error (0.5 mV/10mV) is experienced by reason of the leakage current.

One can overcome this drawback and eliminate the d-c leakage current flowing through sensing resistor 11 by means of an a-c coupled amplifier and an a-c bridge including a transformer. But this solution to the problem is not only complicated and costly, but is also makes it impossible to employ a two-wire transmission system in conjunction with this type of converter.

The Present Converter

Referring now to FIG. 2, there is shown a resistance-to-current converter which provides a simple and effective solution to the problem of leakage and yet makes it possible to utilize a two-wire transmission line. This figure omits two wires 18 and 19 of the transmission line shown in FIG. 1, these lines being connected to the output terminals 25 and 26 of the converter.

Output terminal 25 is connected through a transistor 27, acting as a constant current source, to a Zener diode 28, acting as a constant voltage source. A lead 29 connected between one end of Zener diode 28 and transistor 27 serves as a power supply line for the converter, the other end of this diode being connected to a common line 31.

The output junctions of the bridge circuit constituted by sensing resistor 11 and the three resistors 12, 13 and 14 are respectively connected through resistors 32 and 33 to the non-converting and inverting inputs of an operational amplifier 34. The output of amplifier 34 is connected through a potentiometer 35 to common line 31, the potentiometer serving to effect span adjustment. The slider of potentiometer 35 is connected through a resistor to the inverting input terminal of operational amplifier 34. The output of amplifier 34 is also connected through a positive feedback resistor to the junction between resistors 12 and 32, this feedback effecting linearization.

Between the junction of resistors 12 and 13 and power supply line 29 there is interposed a switching transistor 36. The junction between sensing resistor 11 and resistor 14 which serves for null adjustment, is connected to common line 31, resistor 14 being made variable for this purpose.

An astable multivibrator contained in a dotted line block 39 and constituted by transistors 37 and 38 is connected to output terminal 25. This is accomplished on one side through common line 31 and series-connected diodes 61, and on the other side through a buffer transistor 41. The output of astable multivibrator 39 is applied to the base of switching transistor 36, whereby the excitation power supplied to bridge circuit 15 is "on-off" controlled.

The output of the bridge circuit when in the excitation "on" state or in the non-excitation "off" state is detected separately to produce first and second detection signals, the latter being subtracted from the former to obtain an output signal. To this end, the output of amplifier 34 is connected respectively to hold capacitors 44 and 45 through FET 42 and FET 43. The junction between capacitor 44 and FET 42 is connected through a resistor 46 to the non-inverting input of an operational amplifier 48, while the junction between capacitor 45 and FET 43 is connected through a resistor 47 to the inverting input of the same amplifier.

The output of amplifier 48 is applied through a filter 49 to the base of transistor 51 whose emitter is connected to common line 31, thereby generating a current signal proportional to the output of filter 49. Common line 31 is further connected to terminal 26 through a Zener diode 52 serving to generate bias voltage for the amplifiers, and a feedback resistor 53. The feedback signal generated across resistor 53 is fed back, through resistors 54 and 62 to the non-inverting input and inverting input of amplifier 48, respectively.

The outputs of astable multivibrator 39, whose polarities change alternately, are fed to the respective gates of FET 42 and FET 43. FET 42 is so arranged that it acts in coincidence with the operation of switching transistor 36, such that FET 42 is rendered "on" when switching transistor 36 is rendered "on."

With this arrangement, when switching transistor 36 is rendered conductive, a voltage stabilized by Zener diode 28 is supplied to bridge circuit 15. The output thereof is amplified by amplifier 34, whose output is divided by span-adjusting potentiometer 35 and negatively fed back to its non-inverting input. At the same time, the output of amplifier 34 is positively fed back to its inverting input through the resistor which has high resistance value, to compensate for the non-linearity of input-output characteristics of bridge circuit 15 and the non-linearity of temperature-to-resistance value converting characteristics of sensing resistor 11. Thus an output is obtained which varies linearly in proportion to the changing temperature to be measured.

When transistor 36 is in its "on" state, FET 42 is rendered conductive, whereby the output of amplifier 34 is held by hold capacitor 44. This output signal includes the error component resulting from the leakage current in resistance path 23, as well as the essential or true output component of bridge circuit 15.

In the next half cycle of the operation of astable multivibrator 39, which follows the period in which switching transistor 36 is in its "on" state, the same transistor and FET 42 are rendered non-conductive; and in this instance, FET 45 is turned on to its "on" state. In this state, bridge circuit 15 does not yield its essential output component but produces the error component only. The output then derived from bridge circuit 15, after being amplified by amplifier 34, is applied to hold capacitor 15 through FET 43.

These operations are carried out alternately and cyclically, and the voltages retained by hold capacitors 44, 45 are subtracted from each other by amplifier 48. The difference output from amplifier 48 is smoothed by filter 49, and converted into a current signal by transistor 51. The total circuit current flows into feedback resistor 53, and the feedback voltage generated therein is fed back to the input of amplifier 48. Accordingly, the current flowing between output terminals 25 and 26 may be made proportional to the difference between the voltages held by hold capacitors 44 and 45, and in turn to the essential or true output component of bridge circuit 15.

By adjusting the positive feedback resistor of amplifier 34, the span-adjusting potentiometer 35 and the null-adjusting variable resistor 14, it becomes possible to produce an output signal which, within a fixed range, varies linearly in proportion to temperature change.

Thus a resistance-to-current converter in accordance with this invention, as above described, makes it possible to eliminate the unwanted error component caused by degradation of the insulation of sensing resistor 11. And since an AC bridge and an AC coupled amplifier are not used in this arrangement to get rid of the error component, the circuit configuration may be made simple and compact, and the use of a two-wire type signal transmission technique becomes feasible.

Although, in the above-described preferred embodiment of this invention, amplifier 34 is interposed between bridge circuit 15 and sample hold circuits composed of capacitors 44, 45, FET 42 and FET 43, it is possible to omit this amplifier, if a sufficiently large output can be obtained from bridge circuit 15.

Further, in place of the sample hold circuits, synchronous rectifiers may be used, which function to rectify the output of amplifier 34 in accordance with the outputs of astable multivibrators 39, in which case each output thereof is applied to each input of amplifier 48.

While there has been shown and described a preferred embodiment of a resistance-to-current converter in accordance with the invention, it will be appreciated that many changes and modifications may be made therein without, however, departing from the essential spirit thereof.

I claim:

1. A resistance-to-current converter for producing an output signal that accurately reflects the value of a sensing resistor that is subject to leakage resistance, said converter comprising:
   (A) a resistance bridge, one arm of which is formed by said sensing resistor, said bridge having input and output junctions;
   (B) switching means interposed between a power supply and the input junctions of said bridge to periodically supply an excitation voltage thereto whereby said bridge is alternately in the "on" and "off" state;
   (C) means coupled to the output junctions of said bridge to separately detect the output thereof in the "on" and "off" state to produce a first detected signal which contains a true component accurately reflecting the value of the sensing resistor and an error component reflecting the value of the leakage resistance, and a second detecting signal which reflects only the value of the leakage resistance; and
   (D) means to subtract the second from the first signal to produce an output signal which represents only the value of the sensing resistor and is free of said error component.

2. A converter as set forth in claim 1, wherein said switching means includes a switching transistor which is rendered periodically conductive by an astable multivibrator.

3. A converter as set forth in claim 1, wherein said sensing resistor is a thermometer bulb whose insulation is subject to degradation.

4. A converter as set forth in claim 1, wherein each of said detection means includes a hold capacitor and a field effect transistor.

5. A converter as set forth in claim 4, wherein said subtraction means is constituted by a differential amplifier whose inputs are coupled to the respective detection means.

* * * * *